US012710875B2

(12) United States Patent
Bonneau et al.

(10) Patent No.: US 12,710,875 B2
(45) Date of Patent: Aug. 18, 2026

(54) HOT DATA DETECTION FOR DISAGGREGATED MEMORY USING BLOOM FILTERS

(71) Applicant: Rambus Inc., San Jose, CA (US)

(72) Inventors: Guy Bonneau, Pierrefonds (CA); Larrie Carr, Kelowna (CA)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 18/957,427

(22) Filed: Nov. 22, 2024

(65) Prior Publication Data

US 2025/0181245 A1 Jun. 5, 2025

Related U.S. Application Data

(60) Provisional application No. 63/605,291, filed on Dec. 1, 2023.

(51) Int. Cl.
*G06F 3/06* (2006.01)

(52) U.S. Cl.
CPC .......... *G06F 3/0611* (2013.01); *G06F 3/0653* (2013.01); *G06F 3/0679* (2013.01)

(58) Field of Classification Search
CPC ..... G06F 3/0611; G06F 3/0653; G06F 3/0679
See application file for complete search history.

(56) References Cited

U.S. PATENT DOCUMENTS 10,901,907 B2 1/2021 Bhimani et al.
11,650,933 B2 5/2023 Yang
11,656,979 B2 5/2023 Han et al.
2018/0046378 A1* 2/2018 Coburn ............... G06F 12/1009
2018/0046411 A1* 2/2018 Coburn ................. G06F 3/0685
2023/0036751 A1 2/2023 Guim Bernat et al.
2023/0064745 A1* 3/2023 Dirik ..................... G06F 3/0653
2023/0393783 A1* 12/2023 Meeramohideen Mohamed ........ G06F 3/061
2023/0393976 A1* 12/2023 Tang ..................... G06F 3/0652
2025/0036285 A1* 1/2025 Mukherjee ............ G06F 3/0679

OTHER PUBLICATIONS

"Hot Data Identification for Flash-based Storage Systems Using Multiple Bloom Filters" 2011 IEEE (Year: 2011).*
Park, Dongchul et al., "Hot and Cold Data Identification for Flash Memory Using Multiple Bloom Filters", in Proc. IEEE 27th Symp. Mass Storage Syst. Technol (MSST), Denver, CO, May 2011. 2 pages.

* cited by examiner

*Primary Examiner* — Tasnima Matin
(74) *Attorney, Agent, or Firm* — Lowenstein Sandler LLP

(57) ABSTRACT

A system includes a memory system comprising a near memory component and a far memory component, and a processing device coupled to the memory system. The processing device is configured to track, using a plurality of Bloom filters, respective access requests directed to a plurality of memory pages stored in the memory system. The processing device is further configured to identify, based on weighted results of respective queries of the plurality of Bloom filters, a subset of the plurality of memory pages having a data temperature that satisfies a threshold condition, and cause the subset of the plurality of memory pages to be stored in the near memory component. The identified subset can optionally be applied to a second stage of Bloom filters to further refine the result.

20 Claims, 7 Drawing Sheets

HOT DATA DETECTION FOR DISAGGREGATED MEMORY USING BLOOM FILTERS

RELATED APPLICATIONS

This application claims the benefit of U.S. Provisional Patent Application Ser. No. 63/605,291, filed Dec. 1, 2023, the entire contents of which are hereby incorporated by reference herein.

BACKGROUND

A memory system may include multiple memory components that may store data from a host system. Each memory component may include either the same or a different type of media. Examples of media include, but are not limited to, volatile dynamic random access memory (DRAM) or static random access memory (SRAM), a cross-point array of non-volatile memory, and other non-volatile memory such as NAND-type flash based memory.

BRIEF DESCRIPTION OF THE DRAWINGS

The present disclosure is illustrated by way of example, and not by way of limitation, in the figures of the accompanying drawings.

DETAILED DESCRIPTION

Figure 1:
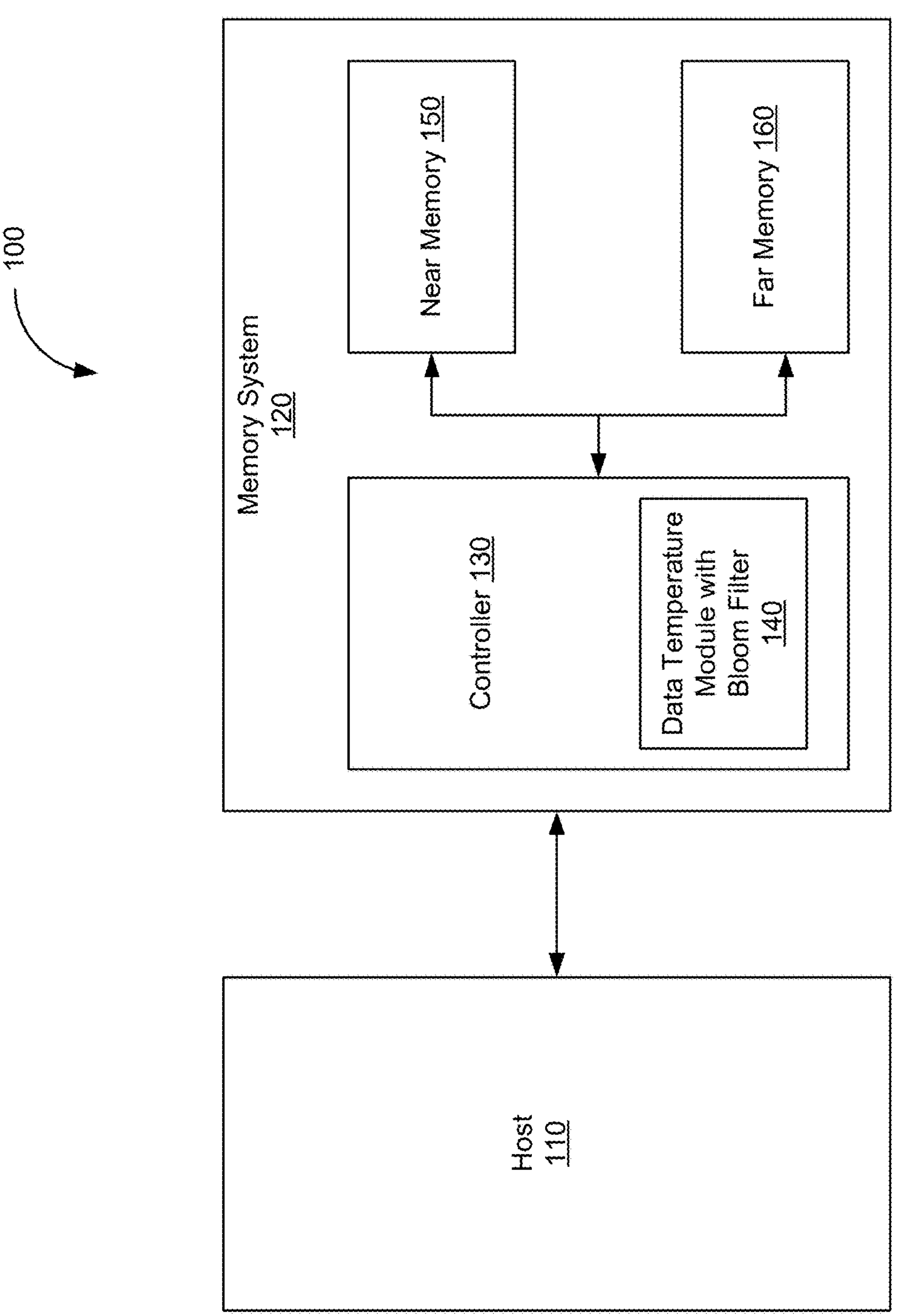
FIG. 1 is a block diagram illustrating an example computing environment including a memory system configured for hot data detection for disaggregated memory using Bloom filters, according to an embodiment.

The following description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Aspects of the present disclosure include a memory system configured for hot data detection for disaggregated memory using Bloom filters. In memory systems including memory components implemented using different types of media, the characteristics of the media may vary from one media type to another. One example of a characteristic associated with a memory component is data density. Data density corresponds to an amount of data (e.g., bits of data) that may be stored in each memory cell of a memory component. Another example of a characteristic of a memory component is access speed. The access speed corresponds to an amount of time required to access data stored at the memory component. Other characteristics of a memory component may be associated with the endurance of the memory component to store data. When data is written to and/or erased from a memory cell of a memory component, the memory cell may be damaged. As the number of write operations and/or erase operations performed on a memory cell increases, the probability of the data stored at the memory cell including an error increases, and the memory cell is increasingly damaged.

In certain memory systems, the storage media used as primary memory may have certain disadvantages, such as having slower access times, thereby causing latencies when servicing data access requests from the host system. Accordingly, these memory systems may implement disaggregated memory tiers using different storage media types, Depending on the temperature of the data (i.e., how frequently the data has been or is likely to be accessed), the data may be stored at a corresponding memory tier. For example, so called "hot" data (i.e., data that has been or is likely to be frequently accessed) may be stored in a "near" memory tier that is implemented using media with faster access times in order to reduce latencies associated with host data accesses, but that is fairly expensive and thus, present in limited quantities in the memory system. In addition, so called "cold" data (i.e., data that has not been or is not likely to be as frequently accessed) may be stored in a "far" memory tier that is implemented using media that has slower access times, but is potentially more reliable and/or less expensive than the media used in the near memory tier. These memory systems that utilize two types of storage media may be referred to as "hybrid" memory systems. The hybridization of memory systems using high-speed and expensive dynamic random access memory (DRAM), for example, as a cache memory for low-cost but slower non-volatile memory, for example, may allow the memory system to have an increased memory capacity at a reduced cost per bit while still maintaining a desired level of performance (i.e., reduced latencies).

Memory systems that utilize this hybrid approach are faced with the challenge of identifying which data to move to the limited near memory tier and which data may be kept in the more ample far memory tier. One goal is to identify the hot data that has either been used recently and/or is likely to be requested by the host system again in the near future, so that such hot data may be kept in the near memory tier for fast host access. The remaining cold data that is not likely to be requested by the host system in the immediate future may be kept in the far memory tier and accessed as needed. One option is to track access statistics for the data, such as at the page level. For example, access counters may be maintained for memory pages, where a respective counter is incremented each time a corresponding page is accessed, and the memory pages having the highest associated access counts may be maintained in the near memory tier. The size of current memory systems, including the volume of data stored therein, makes access tracking at the page level granularity highly impractical, however, as the resources and overhead needed to do so for potentially billions of pages would overwhelm the memory system. The memory system would suffer increased latency due to the access tracking overhead, would have reduced capacity to store host data, and would offer an overall lower quality of service to the host system.

Aspects of the present disclosure address the above and other deficiencies by implementing hot data detection for disaggregated memory using Bloom filters. In one embodiment, a memory controller implements a data temperature module which uses a sequence of Bloom filters to identify hot memory pages. The data temperature module is configured to track, using the sequence of Bloom filters, respective access requests directed to a plurality of memory pages stored in the memory system. The data temperature module is further configured to identify, based on weighted results of respective queries of the sequence of Bloom filters, a subset of the plurality of memory pages having a data temperature that satisfies a threshold condition. This subset of the memory pages may include one or more pages identified as hot memory pages based on the presence of a hashed indicator of those pages in the sequence of Bloom filters. Upon identifying such hot memory pages, the data temperature module may cause the subset of the plurality of memory pages to be stored in a near memory component of the memory system. The near memory component provides lower access latency than a far memory component, although may have a smaller storage capacity than the far memory component.

Advantages of the approach described herein include improved performance in the memory system. The use of a sequence of Bloom filters increases the accuracy of hot data detection while eliminating most false positives. Less overhead is required to identify the hot pages which makes the solution described herein applicable to large capacity memory systems. The sequence of Bloom filters also serves as a moving window into a time sequence of memory accesses that may use historical weighting of both frequency and recency in order to more accurately identify the hot memory pages.

FIG. 1 is a block diagram illustrating an example computing environment 100 including a memory system 120 configured for hot data detection for disaggregated memory using Bloom filters, according to an embodiment. The memory system 120 may include a number of memory components, such as near memory 150, far memory 160, and a memory controller 130. These memory components may be implemented using various media types and may include, for example volatile memory components, non-volatile memory components, or a combination of such. The memory system 120 may represent a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, or a hard disk drive (HDD). Examples of memory modules include a dual in-line memory module (DIMM), a small outline DIMM (SO-DIMM), and a non-volatile dual in-line memory module (NVDIMM). In one embodiment, the near memory 150 and the far memory 160 are included together in a single package. In other embodiments, however, the near memory 150 and the far memory 160 may be physically separated. For example, while the near memory 150 may be located physically near the memory controller 130, the far memory 160 may be located elsewhere.

The computing environment 100 may further include a host system 110 that is coupled to the memory system 120. The host system 110 may use the memory system 120, for example, to write data to the memory components and read data from the memory components. As used herein, "coupled to" generally refers to a connection between components, which may be an indirect communicative connection or direct communicative connection (e.g., without intervening components), whether wired or wireless, including connections such as electrical, optical, magnetic, etc. The host system 110 may be a computing device such as a desktop computer, laptop computer, network server, mobile device, embedded computer (e.g., one included in a vehicle, industrial equipment, or a networked commercial device), or such computing device that includes a memory and a processing device. The host system 110 may include or be coupled to the memory system 120 so that the host system 110 may read data from or write data to the memory system 120. In one embodiment, the host system 110 is coupled to the memory system 120 via a physical host interface. Examples of a physical host interface include, but are not limited to, a serial advanced technology attachment (SATA) interface, a peripheral component interconnect express (PCIe) interface, a compute express link (CXL) interface, universal serial bus (USB) interface, Fibre Channel, Serial Attached SCSI (SAS), etc. The physical host interface may be used to transmit data between the host system 110 and the memory system 120. The host system 10 may further utilize an NVM Express (NVMe) interface to access the memory components when the memory system 120 is coupled with the host system 110 by the PCIe interface. The physical host interface may provide an interface for passing control, address, data, and other signals between the memory system 120 and the host system 110.

The memory components in memory system 120 may include any combination of the different types of non-volatile memory components and/or volatile memory components. For example near memory component 150 may be used as a near memory based on dynamic random access memory (DRAM), or some other type of volatile memory. In one implementation, far memory component 160 may be used as far memory based on NAND-type flash memory, a cross-point array of non-volatile memory cells, or some other type of non-volatile memory. A cross-point array of non-volatile memory may perform bit storage based on a change of bulk resistance, in conjunction with a stackable cross-gridded data access array. Additionally, in contrast to many flash-based memories, cross-point non-volatile memory may perform a write in-place operation, where a non-volatile memory cell may be programmed without the non-volatile memory cell being previously erased.

The memory controller 130 (also referred to herein as a "controller") may communicate with the memory components to perform operations such as reading data, writing data, or erasing data at the memory components and other such operations. The controller 130 may include hardware such as one or more integrated circuits and/or discrete components, a buffer memory, or a combination thereof. The controller 130 may be a microcontroller, special purpose logic circuitry (e.g., a field programmable gate array (FPGA), an application specific integrated circuit (ASIC), etc.), or other suitable processor. The controller 130 may include a processor (e.g., a processing device) configured to execute instructions stored in a local memory. For example, the local memory of the controller 130 may include an embedded memory configured to store instructions for performing various processes, operations, logic flows, and routines that control operation of the memory system 120, including handling communications between the memory system 120 and the host system 110. In some embodiments, the local memory may include memory registers storing memory pointers, fetched data, counters, etc. The local memory may also include read-only memory (ROM) for storing micro-code. While the example memory system 120 in FIG. 1 has been illustrated as including the controller 130, in another embodiment of the present disclosure, a memory system 120 may not include a controller, and may instead rely upon external control (e.g., provided by an external host, or by a processor or controller separate from the memory sub-system).

In general, the controller 130 may receive commands or operations from the host system 110 and may convert the commands or operations into instructions or appropriate commands to achieve the desired access to the memory components. The controller 130 may be responsible for other operations such as wear leveling operations, garbage collection operations, error detection and error-correcting code (ECC) operations, encryption operations, caching operations, and address translations between a logical block address and a physical block address that are associated with the memory components. The controller 130 may further include host interface circuitry to communicate with the host system 110 via the physical host interface. The host interface circuitry may convert the commands received from the host system into command instructions to access the memory components as well as convert responses associated with the memory components into information for the host system 110.

In one embodiment, controller 130 further includes a data temperature module 140 including one or more series of multiple Bloom filters. Data temperature module 140 uses the one or more series of multiple Bloom filters to analyze data pages, such as in response to an access request received by controller 130 from host system 110, to determine the temperature of the data pages and determine, based on the temperature, whether to maintain the data pages in either near memory 150 or far memory 160. The Bloom filters store an indication of data pages that have been previously accessed, and thus may be used to identify data pages that are hot (i.e., have been accessed and/or are likely to be accessed again in the future). In one embodiment, each series of multiple Bloom filters is used to monitor the occurrence of hot pages over a period of time. Thus, the values stored in the sequence of Bloom filters may be used to identify so called hot data pages. For example, the probability of a given data page appearing in the series of Bloom filters is representative of the probability that the data page will be accessed by the host system 110 at every based unit of time of a clock-based event. If that probability exceeds a defined threshold for the memory system 120, then data temperature module 140 may store the corresponding data page in near memory 150. Otherwise the data page may be maintained in far memory 160.

As the number of page accesses grows, the practical limitations on the size of the Bloom filters prevent every page from being uniquely identified. Accordingly, the possibility of false positives exists where certain data pages may be incorrectly identified as being "hot pages" present in the series of Bloom filters. Accordingly, in some embodiments, the data temperature module 140 may include one or more additional series of Bloom filters to handle the spill-over of cold pages and the false positive pages from the first series of Bloom filters. In these embodiments, the hot data pages identified in the first series of Bloom filters may be used as an input to search the one or more additional series of Bloom filters, which will statistically reduce the probability of such false positives or the spill-over of cold pages. This multi-tiered approach ensures that the true "hot" pages are accurately identified, overcoming challenges posed by the sheer volume of page accesses and the varying probabilities associated with these pages. The additional series of Bloom filters may enhance the accuracy and reliability of hot page detection in high-traffic scenarios. Further details with regards to the operations of data temperature module 140, and the use of the one or more sequences of Bloom filters, are described below.

Figure 2A:
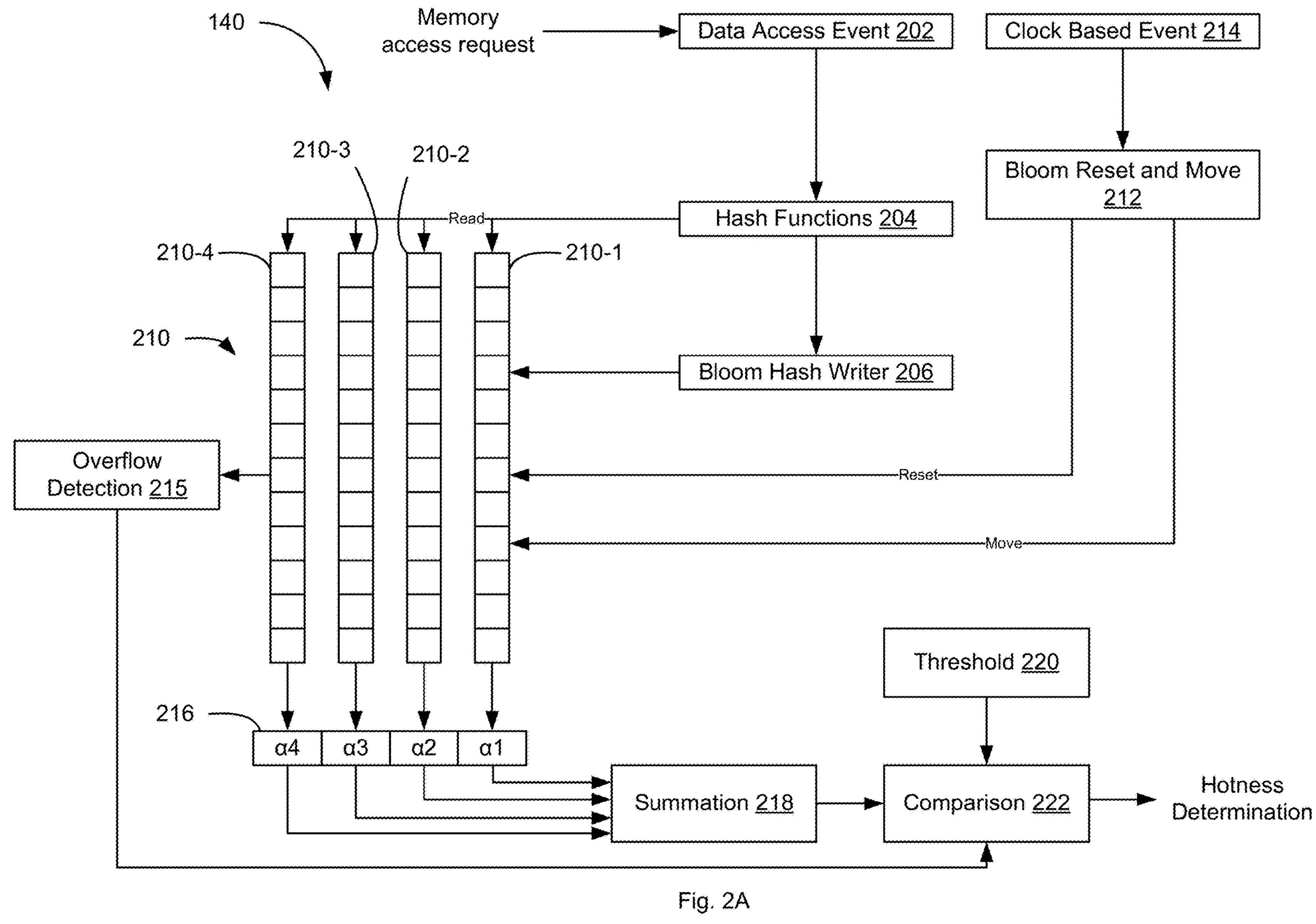
FIG. 2A is a block diagram illustrating conceptual operation of the data temperature module including a sequence of Bloom filters, according to an embodiment.

FIG. 2A is a block diagram illustrating conceptual operation of the data temperature module 140, including a sequence of Bloom filters 210, according to an embodiment. A Bloom filter includes an array of a certain number of bits (e.g., "m" bits) each having a unique index and initially set to an initial state (e.g., "0"). In one embodiment, a certain number of hash functions (e.g., "n" hash functions) may be used to hash incoming input values. In the implementation described herein, the input values may include page identifiers or memory addresses of the data being accessed in the memory system 120. The respective resulting hashes from each of the n hash functions are used to identify respective indexes of a number of the m bits in the Bloom filter, and the corresponding bits may be changed to a set state (e.g., "1"). When a subsequent input value is received, all n hash functions are applied again to that new input value and the state of the corresponding bits in the Bloom filter (i.e., the bits having indexes that match the outputs of the hash functions) are checked. If all of those bits are in the set state, the processing logic may determine that the page ID may be found in the Bloom filter. There remains a possibility of a false positive though, since multiple different page IDs could be hashed to the same or overlapping index positions. If, however, at least one of the corresponding bits is in the initial state (e.g., "0"), the processing logic may determine definitively that the page ID is not in the Bloom filter. Depending on the embodiment, the sequence of Bloom filters 210 may include any number of Bloom filters (e.g., "k" filters). Each of the k Bloom filters functions independently and may be updated and checked separately, as described above.

Data temperature module 140 uses the sequence of Bloom filters 210 to identify hot data pages, which may be stored in near memory 150. To do so, data temperature module 140 determines the probability $p_k$ of a data page appearing in k number of Bloom filters (e.g., 210-1 to 210-4) within a given window of t clock-based events, based on the probability $p_h$ of the data page being accessed at every base unit of time of the clock-based event 214. The design of a Bloom filter means that in such a scenario, each Bloom filter is responsible for tracking t/k memory access events. In addition, the occurrence of the same hashed page ID for a data page may not be recorded more than k times across the sequence of Bloom filters 210. In the event that k instances of the identical hashed page ID have already been registered in the sequence of Bloom filters 210, the introduction of a new page ID (k+1) within the window of t events becomes detectable. This is due to the fact that the k occurrences of the same page ID have already been captured across the k Bloom filters (e.g., 210-1 to 210-4). This situation represents an overflow condition that may be identified as overflow detection 215. The inability to accommodate this new registration within the k Bloom filters is due to their limited size. Despite not being able to register this additional page ID due to the finite number of k Bloom filters, the insight garnered from the overflow detection 215 enables the option to flexibly configure hot memory detection. This configuration may leverage the existing k Bloom filters to detect occurrences of up to k+1 distinct page ID access events. This approach optimally utilizes the resource of k Bloom filters while enabling the detection of the desired range of occurrences.

In one embodiment, when a data access event 202, such as a data page access request, occurs, data temperature module 140 applies a number of hash functions 204 to an identifier (e.g., a page ID or memory address) of the requested data page. As noted above, there may be any number n of hash functions 204, where the number n may vary depending on the implementation. Depending on the embodiment, the hash functions 204 may be categorized into distinct families based on their core operations and design. One such family is ARX (Addition, Rotation, and XOR), which processes fixed-size input blocks to generate fixed-size output hashes. ARX primarily employs three main operations: addition (A), rotation (R), and bitwise XOR (X). Some examples in this family include SipHash and BLAKE2. Another family involves multiplicative hash functions, which utilize prime numbers for hashing. An example of this family is the Jenkins Lookup3 hash. Additionally, cryptographic hash functions form another family designed to resist various attacks, ensuring security. Some examples within this family are SHA-256 and SHA-3. The respective resulting hashes from each of the n hash functions 204 are used to identify respective indexes of a number of the m bits in a first Bloom filter 210-1, and Bloom hash writer 206 may change the corresponding bits from an initial state (e.g., "0") to a set state (e.g., "1"). As additional data access events 202 are received, the same process may be repeated where data temperature module 140 applies hash functions 204, and Bloom hash writer 206 updates the corresponding bits of Bloom filter 210-1.

In one embodiment, if the data temperature module 140 determines that the corresponding bits in the first Bloom filter 210-1 have already been set, thereby indicating that the associated data page has previously been accessed, data temperature module 140 may instead set the bits corresponding to the identified index values in the second Bloom filter 210-2. Similarly, if the corresponding bits in the second Bloom filter 210-2 have already been set, data temperature module 140 may set the bits corresponding to the identified index values in the third Bloom filter 210-3. The same may be done for the fourth Bloom filter 210-4, as well. In this manner, data temperature module 140 may track multiple accesses of a given data page within a window of t time-based events. If data temperature module 140 determines that the corresponding bits in each of the sequence of Bloom filters 210 have already been set (i.e., that the requested data page has already been registered in each of Bloom filters 210-1 to 210-4), an overflow detection 215 may be utilized. Overflow detection 215 may a flag (e.g., a bit) that is set to indicate that the requested data page may not be registered in the sequence of Bloom filters 210 because it is already registered in each Bloom filter in the sequence. When the overflow detection 215 flag is set, this may be used as an indication of data hotness, regardless of the result of comparison 222, as described below.

Over time, Bloom reset and move operations 212 may be performed to either reset the sequence of Bloom filters 210 or move the contents of one Bloom filter to the next in the sequence (e.g., from the first Bloom filter 210-1 to a second Bloom filter 210-2, from the second Bloom filter 210-2 to a third Bloom filter 210-3, from the third Bloom filter 210-3 to a fourth Bloom filter 210-4, or from the fourth Bloom filter 210-4 to the first Bloom filter 210-1). These reset and move operations 212 may be performed according to a constant time base furnished according to the occurrence of a clock based event 214. There may be no more than one memory access per clock based event 214, which ensures that each event, representing a unit of time, corresponds to at most a single memory access. With every passing interval of a given number of events (e.g., t/k events), the system approaches the occurrence of a reset or move operation. Thus, data temperature module 140 is designed such that the likelihood of experiencing k occurrences within the sequence of Bloom filters 210 for a given hot page surpasses a defined threshold 220, as will be described in more detail below.

The selection of this value for t hinges upon the implementation specifics and may vary depending on the embodiment. Nonetheless, the interrelation between these parameters adheres to a mathematical construct known as the Binomial Probability Distribution, denoted as $p_k$=Binomial ($p_h$, k, t). This distribution may be harnessed to parametrize the mechanics of the sequence of Bloom filters 210.

For example, by adopting the time interval of the clock based event 214 as 1 nanosecond, the data temperature module 140 may ascertain the probability of encountering any memory page access within a brief temporal span, contingent upon a particular rate. This probability p assumes distinct values for each memory page. In the case of a hot page, the system may identify those instances wherein the probability is superior to a designated threshold $p_h$. The Binomial Probability Distribution may thus indicate how many events (e.g., memory access requests) must transpire to observe, at the very least, k memory pages with the probability $p_h$ accesses characterized by a probability equal to or surpassing $p_k$. By invoking this function, the value t is determined signifying the observable time window for the sequence of Bloom filters 210. Subsequently, the value t for the Bloom reset and move operations 212 may be determined by computing t divided by k. After every t/k events, there may be rotation of the Bloom filters 210 in a round-robin fashion, where the first Bloom filter 210-1 is moved to the second, the second Bloom filter 210-2 is moved to the third, the third Bloom filter 210-3 is moved to the fourth, and the fourth Bloom filter 210-4 (or kth Bloom filter) is reset to 0 and moved to become the new first Bloom filter. This rotation process enables the sequence of Bloom filters 210 to continually monitor memory accesses as time progresses, ensuring that they are always capturing the most recent data.

Whenever a data access event 202 occurs, a concurrent query is launched across each of the sequence of Bloom filters 210. As above, the data temperature module 140 applies hash functions 204 to an identifier of the requested data page and checks each of the sequence of Bloom filters 210 for the presence of the index(es) derived from the hash functions 204. The respective outcome of the query corresponding to each of the Bloom filters 210 may be an either affirmative ("yes") or negative ("no") and may be represented as a numerical value (e.g., a 1 or 0). As noted above, an affirmative result could potentially be a false positive for a given Bloom filter.

This numerical outcome is then subjected to a multiplication process involving the α(k) factor 216. A respective α(k) factor, referred to as the recency constant, is associated with each Bloom filter to modulate the result derived from the query. For example, the output from Bloom filter 210-1 is multiplied by $\alpha1$, the output from Bloom filter 210-2 is multiplied by $\alpha2$, the output from Bloom filter 210-3 is multiplied by $\alpha3$, and the output from Bloom filter 210-4 is multiplied by $\alpha4$. The primary function of $\alpha(k)$ is to bestow a time-dependent filtering weight to account for the time-sensitive nature of memory page hotness. Thus, $\alpha(k)$ introduces a mechanism for applying a varying weight based on the temporal context. Given that the hotness of a memory page is subject to dynamic shifts over time, this $\alpha(k)$ factor accommodates such temporal nuances. Notably, $\alpha(k)$ is implementation-specific, and adaptable to various values. Although no specific value is specified, it's common for $\alpha(k)$ to exhibit a trend of reduction as the parameter k increases. This reduction is often observed due to the dynamic nature of memory page hotness, which typically diminishes as time progresses.

The result of each output multiplied by the respective $\alpha(k)$ factor are summed together in summation operation 218. The results of summation operation 218 and a threshold value 220 are compared to one another at comparison operation 222. The threshold value 220 represents the hotness threshold, and may be selected to ensure that, when the cumulative weighted output from the querying of the k Bloom filters reaches or surpasses this threshold, a memory page possessing a probability $p_h$ will be classified as "hot." Thus, the threshold value 220 serves as the point of demarcation that determines whether a memory page, with a probability of $p_h$ should be identified as a "hot" entity. The chosen value for threshold value 220 dictates the level of cumulative weighted evidence necessary for this classification. Accordingly, the threshold value 220 may be strategically calibrated to effectively capture the desired level of hotness, based on the combined output of the individual Bloom filter queries. Upon determining that a given memory page is hot, data temperature module 140 may take some corresponding action, such as moving that memory page to near memory 150 to reduce access latency for the host system 110 in the future.

Figure 2B:
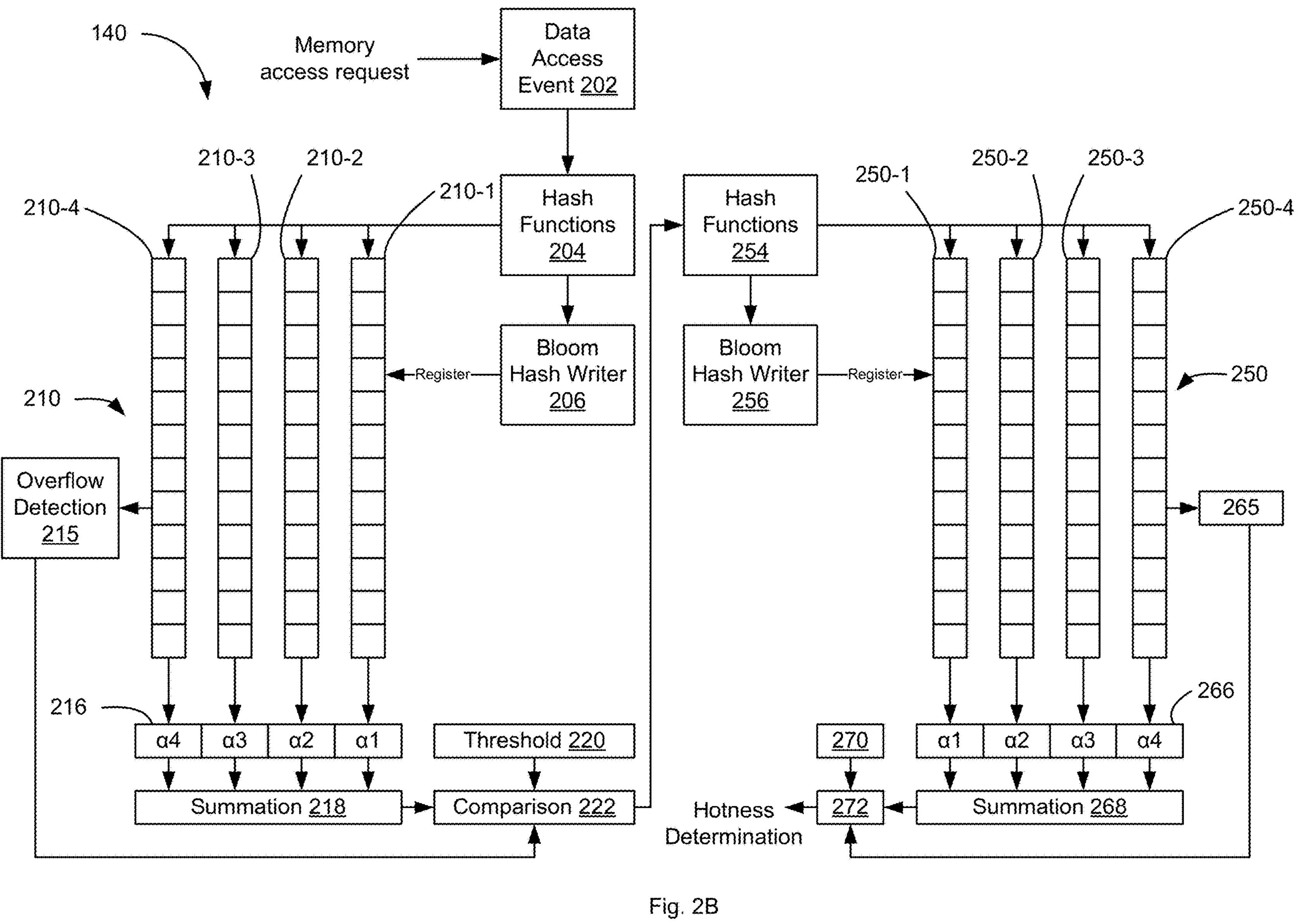
FIG. 2B is a block diagram illustrating conceptual operation of the data temperature module including multiple sequences of Bloom filters, according to an embodiment.

FIG. 2B is a block diagram illustrating conceptual operation of the data temperature module including multiple sequences of Bloom filters, according to an embodiment. As illustrated, data temperature module 140 may include a second a second sequence of Bloom filters 250, in addition to sequence 210. In one embodiment, the output of comparison 222 (i.e., an indication of whether a requested memory page is "hot") is used as an input for the second sequence of Bloom filters 250. In one embodiment, data temperature module 140 applies a number of hash functions 254, which may be the same or different than hash functions 204, to the identifier of the "hot" memory page as determined using the first sequence of Bloom filters 210. The respective resulting hashes from each of the hash functions 254 are used to identify respective indexes of a number of the bits in a first Bloom filter 250-1, and Bloom hash writer 256 may change the corresponding bits from an initial state (e.g., "0") to a set state (e.g., "1"). As additional "hot" memory pages are identified using the first sequence of Bloom filters 250, the same process may be repeated where data temperature module 140 applies hash functions 254, and Bloom hash writer 256 updates the corresponding bits of Bloom filter 250-1. If the memory page is already registered in the first Bloom filter 250-1, subsequent attempts may be made to register the memory page in the additional Bloom filters 250-2, 250-3, and 250-4. This process may continue until either a Bloom filter is found where the memory page is not registered or all Bloom filters in the series 250 are traversed, in which case overflow detection 265 may be utilized.

In addition, whenever "hot" memory page is identified using the first series of Bloom filters 210, a query is launched across each of the second sequence of Bloom filters 250. As above, the data temperature module 140 applies hash functions 254 to an identifier of the "hot" memory page and checks each of the second sequence of Bloom filters 250 for the presence of the index(es) derived from the hash functions 254. The respective outcome of the query corresponding to each of the Bloom filters 250 may be an either affirmative ("yes") or negative ("no") and may be represented as a numerical value (e.g., a 1 or 0). This numerical outcome is then subjected to a multiplication process involving the $\alpha(k)$ factor 266. The results of each output multiplied by the respective $\alpha(k)$ factor are summed together in summation operation 268. The result of summation operation 268 and a threshold value 270 are compared to one another at comparison operation 272 to determine whether the memory page is properly classified as "hot."

Figure 3:
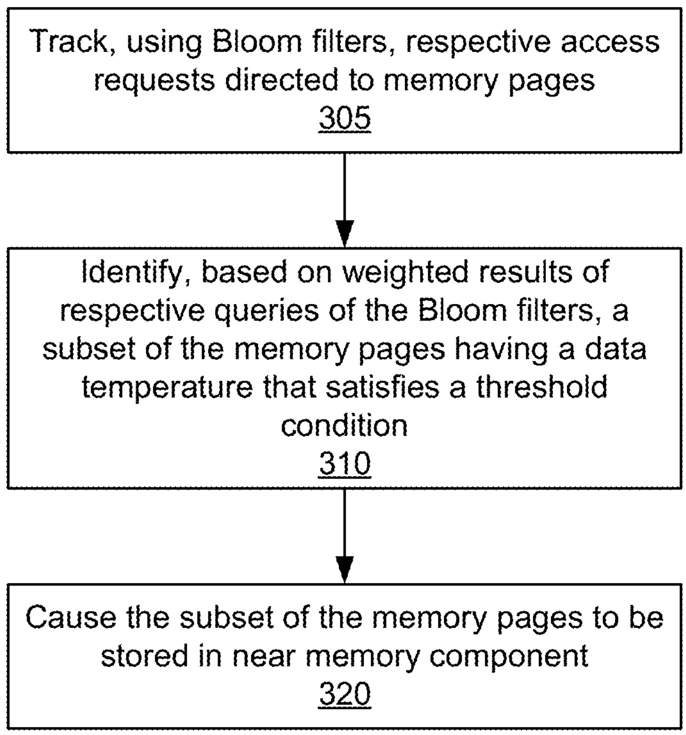
FIG. 3 is a flow diagram illustrating a method of hot data detection for disaggregated memory using Bloom filters, according to an embodiment.

FIG. 3 is a flow diagram illustrating a method of hot data detection for disaggregated memory using Bloom filters, according to an embodiment. The method 300 may be performed by processing logic that comprises hardware (e.g., circuitry, dedicated logic, programmable logic, microcode, etc.), software (e.g., instructions run on a processor to perform hardware simulation), firmware, or a combination thereof. In one embodiment, method 300 may be performed by data temperature module 140, as shown in FIG. 1, FIG. 2A, and FIG. 2B.

Referring again to FIG. 3, at operation 305, the processing logic tracks, using a plurality of Bloom filters 210, respective access requests directed to a plurality of memory pages stored in the memory system 120. As described in more detail below with respect to method 400 of FIG. 4, data temperature module 140 may record the occurrence of recent and frequent memory accesses for individual segments of data (e.g., memory pages) in the sequence of Bloom filters 210. The sequence of Bloom filters 210 thus maintains an indication of recently accessed memory pages over a given period of time (i.e., a sliding window) which may subsequently be queried to identify the relatively hot memory pages. Such a tracking process may be repeated for each subsequently received access request.

At operation 310, the processing logic identifies, based on weighted results of respective queries of the plurality of Bloom filters 210, a subset of the plurality of memory pages having a data temperature that satisfies a threshold condition. As additional memory access requests are received, data temperature module 140 may query the sequence of Bloom filters 210 to identify if the requested memory pages are represented in the sequence of Bloom filters 210. A value indicating the presence of such a representation, once multiplied by a weighting factor, may be compared to a configurable threshold in order to determine whether the memory page satisfies the threshold condition. As described in more detail below with respect to method 500 of FIG. 5, if the query result satisfies the threshold condition, data temperature module 140 may determine that the memory page is a hot page. In one embodiment, those memory pages that are identified as "hot" pages using the sequence of Bloom filters 210 may be used to query one or more additional sequences of Bloom filters, such as second sequence of Bloom filters 250, as illustrated in FIG. 2B. This multi-stage filtering process helps reduce the probability of a "cold" memory page being incorrectly identified as a "hot"

memory page (i.e., a false positive). Thus, the first subset of "hot" memory pages identified using the first sequence of Bloom filters 210 may be further filtered to form a second subset of "host memory pages" using the second sequence of Bloom filters 250. Such an identification process may be repeated for each subsequently received access request.

At operation 315, the processing logic causes the subset of the plurality of memory pages to be stored in a near memory component 150. Upon identifying one or more memory pages that are hot, data temperature module 140 may store those memory pages in near memory component 150. If the memory pages are already in near memory component 150, they may be maintained there until subsequent analysis indicates that they are no longer hot. If however, the memory pages are currently stored in far memory component 160, data temperature module 140 may cause the memory page to be migrated from the far memory component 160 to the near memory component 150. In one embodiment, the near memory component 150 (e.g., a dynamic random access memory (DRAM) component) provides lower access latency than the far memory component 160 (e.g., a NAND-type flash memory component), but may have a smaller storage capacity than the far memory component 160. In other embodiments, the far memory component 160 may also be a DRAM component that is instead accessed over a communications link, such as Compute Express Link (CXL), for example.

Figure 4:
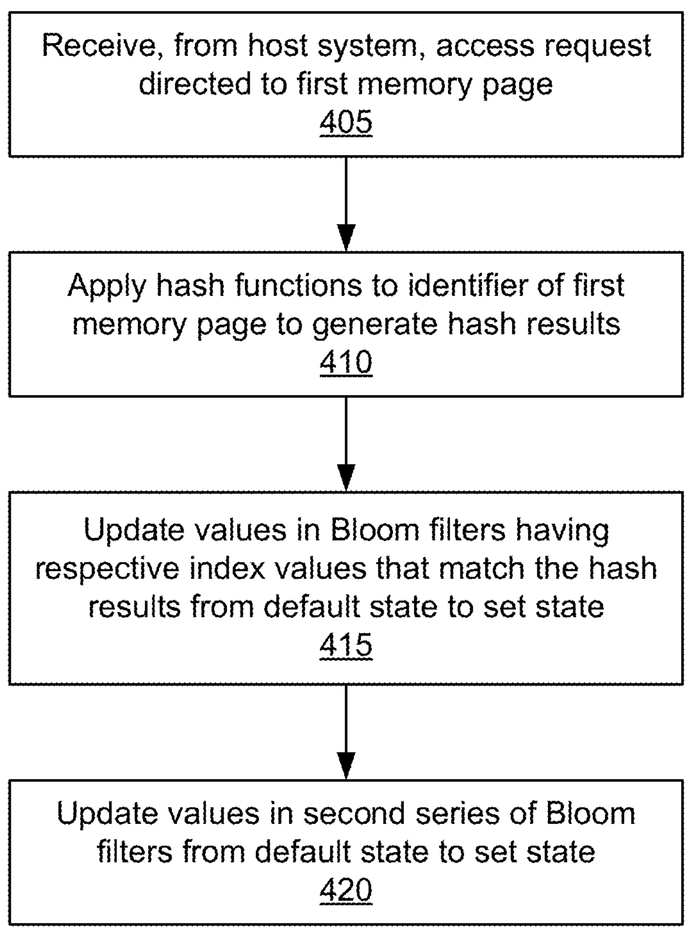
FIG. 4 is a flow diagram illustrating a method of tracking memory page access requests using a sequence of Bloom filters, according to an embodiment.

FIG. 4 is a flow diagram illustrating a method of tracking memory page access requests using a sequence of Bloom filters, according to an embodiment. The method 400 may be performed by processing logic that comprises hardware (e.g., circuitry, dedicated logic, programmable logic, microcode, etc.), software (e.g., instructions run on a processor to perform hardware simulation), firmware, or a combination thereof. In one embodiment, method 400 may be performed by data temperature module 140, as shown in FIG. 1, FIG. 2A, and FIG. 2B.

Referring again to FIG. 4, at operation 405, the processing logic receives, from a host system 110, an access request directed to a first memory page of a plurality of memory pages. In one embodiment, the memory access request may be a read or a write request sent by host system 110 and may include an indicator or address associated with the first memory page. Such an access request may be represented by data access event 202.

At operation 410, the processing logic applies a plurality of hash functions 204 to an identifier of the first memory page to generate a plurality of hash results. In one embodiment, data temperature module 140 applies a number of hash functions 204 to an identifier (e.g., a page ID or memory address) of the requested memory page. The result of each hash function is a value representing an index of an entry in a Bloom filter.

At operation 415, the processing logic updates one or more values in the plurality of Bloom filters 210 from a default state to a set state, wherein the one or more values have respective index values that match the plurality of hash results. In one embodiment, each entry in the Bloom filters is initially set to a default state (e.g., "0"). Bloom hash writer 206 of the data temperature module may change entries having index values that match the hash results of the memory page identifier from that default state to a set state (e.g., "1"). As there are multiple hash functions 204 applied to each memory page identifier, there may be multiple different hash results, and thus multiple entries in the Bloom filters may be updated for a single memory page identifier. In one embodiment, data temperature module 140 checks the entries in a first Bloom filter 210-1 that have index values matching the determined hash results to see if those entries are in the set state (thus indicating that the requested memory page has already been registered in the first Bloom filter 210-1). If so, subsequent attempts may be made to register the memory page in the additional Bloom filters 210-2, 210-3, and 210-4. This process may continue until either a Bloom filter is found where the memory page is not registered or all Bloom filters in the series 210 are traversed, in which case overflow detection 215 may be utilized.

At operation 420, the processing logic updates one or more values in a second plurality of Bloom filters 250 from the default state to the set state, wherein the one or more values have respective index values that match the plurality of hash results representing a subset of the plurality of memory pages identified using the first plurality of Bloom filters 210.

Figure 5:
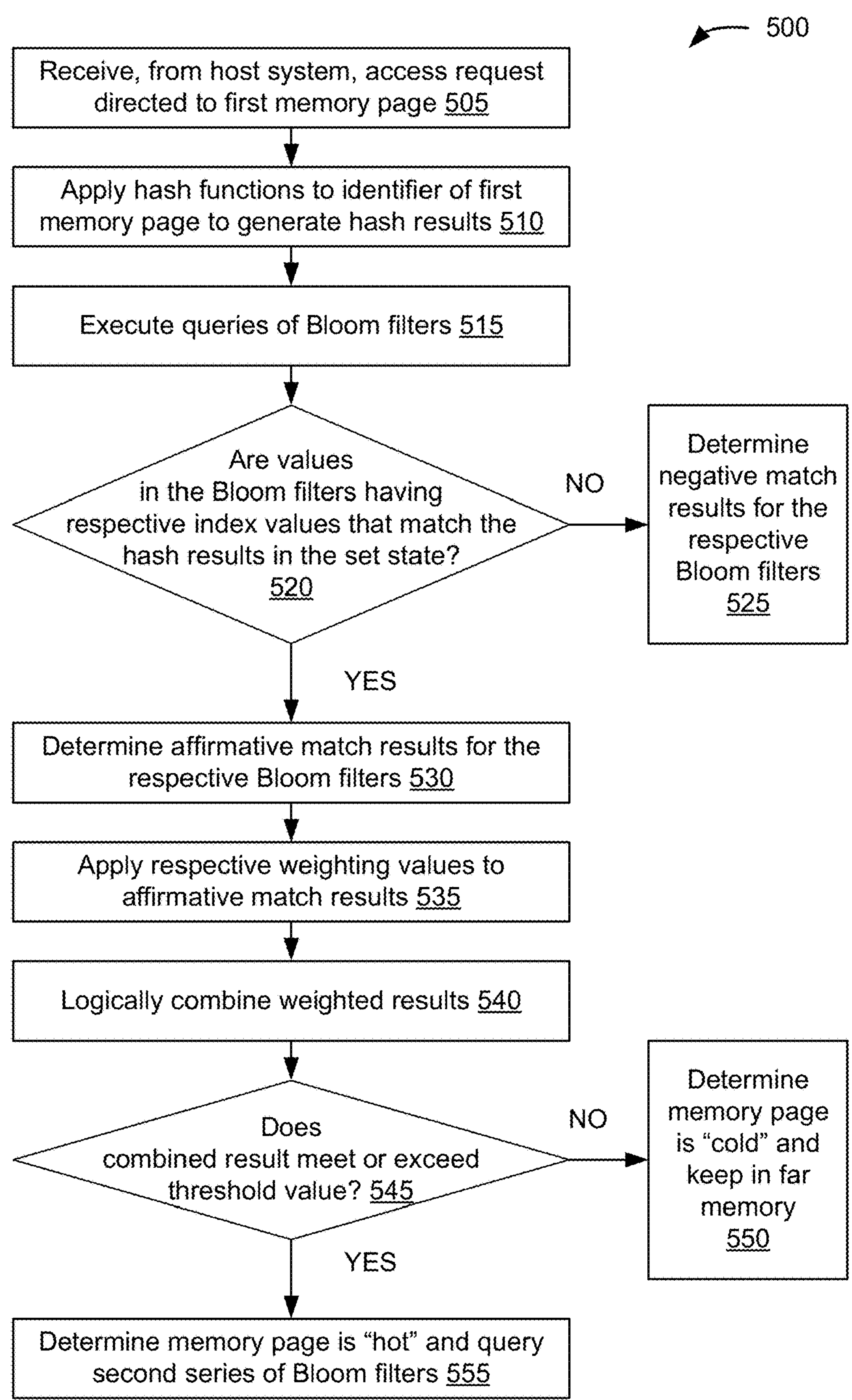
FIG. 5 is a flow diagram illustrating a method of querying a sequence of Bloom filters to detect hot memory pages, according to an embodiment.

FIG. 5 is a flow diagram illustrating a method of querying a sequence of Bloom filters to detect hot memory pages, according to an embodiment. The method 500 may be performed by processing logic that comprises hardware (e.g., circuitry, dedicated logic, programmable logic, microcode, etc.), software (e.g., instructions run on a processor to perform hardware simulation), firmware, or a combination thereof. In one embodiment, method 500 may be performed by data temperature module 140, as shown in FIG. 1, FIG. 2A, and FIG. 2B.

Referring again to FIG. 5, at operation 505, the processing logic receives, from a host system 110, an access request directed to a first memory page of a plurality of memory pages. In one embodiment, the memory access request may be a read or a write request sent by host system 110 and may include an indicator or address associated with the first memory page. Such an access request may be represented by data access event 202.

At operation 510, the processing logic applies a plurality of hash functions 204 to an identifier of the first memory page to generate a plurality of hash results. In one embodiment, data temperature module 140 applies a number of hash functions 204 to an identifier (e.g., a page ID or memory address) of the requested memory page. The result of each hash function is a value representing an index of an entry in a Bloom filter.

At operation 515, the processing logic executes respective queries of the plurality of Bloom filters 210. Whenever a data access event 202 occurs, a concurrent query is launched across each of the sequence of Bloom filters 210. In one embodiment, data temperature module 140 performs a query on each of the sequence of Bloom filters 210 for the presence of the index(es) derived at operation 510 from the hash functions 204.

At operation 520, the processing logic determines whether respective one or more values in the respective Bloom filters 210 are in a set state, wherein the one or more values have respective index values that match the plurality of hash results. Upon identifying the index or indexes in a given one of the sequence of Bloom filters 210, data temperature module may read the values stored at the index or indexes to determine whether they are in the set state (i.e., a value of "1"). The respective outcome of the query corresponding to each of the Bloom filters 210 may be an either affirmative ("yes") or negative ("no") and may be represented as a numerical output value (e.g., a 1 or 0). Thus, there may be a corresponding output value for the query executed against each of the sequence of Bloom filters 210.

Responsive to at least one of the respective one or more values in the respective Bloom filters not being in the set state, at operation 525, the processing logic determines respective negative match results for the respective Bloom filters. For example, if one or more of the values at the determined indexes in a given Bloom filter are in the default state, the output of the query for that Bloom filter is negative and may be represented as an output of "0."

Responsive to the respective one or more values in the respective Bloom filters being in the set state, at operation 530, the processing logic determines respective affirmative match results for the respective Bloom filters. For example, if each of the values at the determined indexes in a given Bloom filter are in the set state, the output of the query for that Bloom filter is affirmative and may be represent as an output of "1."

At operation 535, the processing logic applies respective weighting values to the respective affirmative match results to determine the weighted results of the respective queries. In one embodiment, the numerical outcome value of each query is multiplied by a respective recency constant, such as $\alpha(k)$ factor 216. The $\alpha(k)$ factor is a time-dependent filtering weight that varies for each Bloom filter in the sequence 210.

At operation 540, the processing logic logically combines the weighted results of the respected queries to determine a combined result. In one embodiment, the results of each output multiplied by the respective $\alpha(k)$ factor are summed together in summation operation 218.

At operation 545, the processing logic compares the combined result to a threshold value to determine whether the combined result meets or exceeds the threshold value. In one embodiment, at comparison operation 222, the data temperature module 140 compare the result of summation operation 218 and a threshold value 220. The threshold value 220 represents the hotness threshold, and may be selected to ensure that, when the cumulative weighted output from the querying of the k Bloom filters reaches or surpasses this threshold, a memory page possessing a probability $p_h$ or greater will be classified as "hot." Thus, the threshold value 220 serves as the point of demarcation that determines whether a memory page, with a probability of $p_h$ or greater should be identified as a "hot" entity. The chosen value for threshold value 220 dictates the level of cumulative weighted evidence necessary for this classification.

Responsive to determining that the combined result is less than the threshold value, at operation 550, the processing logic determines that the memory page is "cold" and keeps the memory page in far memory 160.

Responsive to determining that the combined result meets or exceeds the threshold value, at operation 555, the processing logic determines that the memory page is "hot" (i.e., part of the subset of memory pages having a data temperature that satisfies a threshold condition) and optionally queries a second series of Bloom filters 250. In one embodiment, those memory pages that are identified as "hot" pages using the sequence of Bloom filters 210 may be used to query one or more additional sequences of Bloom filters, such as second sequence of Bloom filters 250, as illustrated in FIG. 2B. This multi-stage filtering process helps reduce the probability of a "cold" memory page being incorrectly identified as a "hot" memory page (i.e., a false positive). Thus, the first subset of "hot" memory pages identified using the first sequence of Bloom filters 210 may be further filtered to form a second subset of "host memory pages" using the second sequence of Bloom filters 250. The data temperature module 140 may cause any memory pages that are identified as "hot" using the second sequence of Bloom filters 250 to be stored in the near memory component 150. If the memory page is already in near memory component 150, it may be maintained there. If however, the memory page is currently stored in far memory component 160, the processing logic may cause the memory page to be migrated from the far memory component 160 to the near memory component 150.

Figure 6:
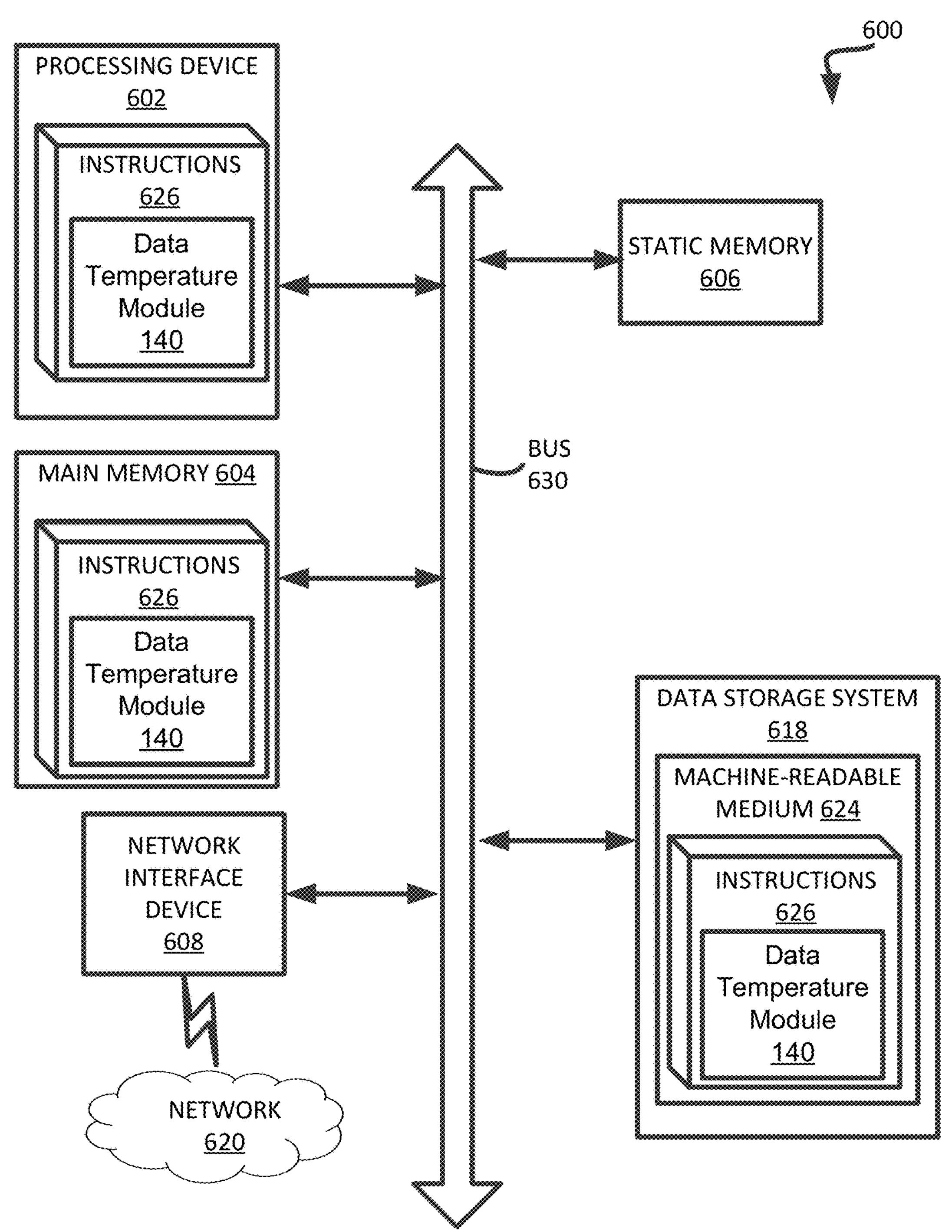
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, may be executed. In some embodiments, the computer system 600 may correspond to a host system (e.g., the host system 110 of FIG. 1) that includes, is coupled to, or utilizes a memory system (e.g., the memory system 120 of FIG. 1) or may be used to perform the operations of a controller. In alternative embodiments, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 may further include a network interface device 608 to communicate over the network 620.

The data storage system 618 may include a machine-readable storage medium 624 (also known as a computer-readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 may correspond to the memory system 120 of FIG. 1.

In one embodiment, the instructions 626 include instructions to implement functionality corresponding to the data temperature module 140 of FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

What is claimed is:

1. A system comprising:

a memory system comprising a near memory component and a far memory component; and a processing device coupled to the memory system and configured to:

track, using a plurality of Bloom filters, respective access requests directed to a plurality of memory pages stored in the memory system;

identify, based on a combination of weighted results of concurrent respective queries of the plurality of Bloom filters, a subset of the plurality of memory pages having a data temperature that satisfies a threshold condition; and cause the subset of the plurality of memory pages to be stored in the near memory component.

2. The system of claim 1, wherein to track the respective access requests directed to the plurality of memory pages, the processing device is to:

receive, from a host system, an access request directed to a first memory page of the plurality of memory pages;

apply a plurality of hash functions to an identifier of the first memory page to generate a plurality of hash results; and update one or more values in the plurality of Bloom filters from a default state to a set state, wherein the one or more values have respective index values that match the plurality of hash results.

3. The system of claim 2, wherein to track the respective access requests directed to the plurality of memory pages, the processing device is further to:

update one or more values in a second plurality of Bloom filters from the default state to the set state, wherein the one or more values have respective index values that match the plurality of hash results representing the subset of the plurality of memory pages identified using the plurality of Bloom filters.

4. The system of claim 1, wherein to identify the subset of the plurality of memory pages having the data temperature that satisfies the threshold condition, the processing device is to:

receive, from a host system, an access request directed to a first memory page of the plurality of memory pages;

apply a plurality of hash functions to an identifier of the first memory page to generate a plurality of hash results; and execute respective queries of the plurality of Bloom filters to determine whether respective one or more values in the respective Bloom filters are in a set state, wherein the one or more values have respective index values that match the plurality of hash results.

5. The system of claim 4, wherein to identify the subset of the plurality of memory pages having the data temperature that satisfies the threshold condition, the processing device is further to:

responsive to the respective one or more values in the respective Bloom filters being in the set state, determine respective affirmative match results for the respective Bloom filters;

apply respective weighting values to the respective affirmative match results to determine the weighted results of the respective queries;

logically combine the weighted results of the respected queries to determine a combined result; and compare the combined result to a threshold value.

6. The system of claim 5, wherein the combined result meeting or exceeding the threshold value indicates that the first memory page is part of the subset of the plurality of memory pages having the data temperature that satisfies the threshold condition.

7. The system of claim 1, wherein the processing device is further to:

responsive to determining that the subset of the plurality of memory pages have the data temperature that satisfies the threshold condition, filter the subset of the plurality of memory pages using a second plurality of Bloom filters.

8. The system of claim 1, wherein the near memory component provides lower access latency than the far memory component, and wherein the near memory component has a smaller storage capacity than the far memory component.

9. The system of claim 1, wherein the processing device is further to:

perform at least one of a move operation or a reset operation on the plurality of Bloom filters in response to an occurrence of a clock-based time event.

10. A method comprising:

tracking, using a plurality of Bloom filters, respective access requests directed to a plurality of memory pages stored in a memory system comprising a near memory component and a far memory component;

identifying, based on a combination of weighted results of concurrent respective queries of the plurality of Bloom filters, a subset of the plurality of memory pages having a data temperature that satisfies a threshold condition; and causing the subset of the plurality of memory pages to be stored in the near memory component.

11. The method of claim 10, wherein tracking the respective access requests directed to the plurality of memory pages comprises:

receiving, from a host system, an access request directed to a first memory page of the plurality of memory pages;

applying a plurality of hash functions to an identifier of the first memory page to generate a plurality of hash results; and updating one or more values in a first Bloom filter of the plurality of Bloom filters from a default state to a set state, wherein the one or more values have respective index values that match the plurality of hash results.

12. The method of claim 11, wherein tracking the respective access requests directed to the plurality of memory pages further comprises:

updating one or more values in a second plurality of Bloom filters from the default state to the set state, wherein the one or more values have respective index values that match the plurality of hash results representing the subset of the plurality of memory pages identified using the plurality of Bloom filters.

13. The method of claim 10, wherein identifying the subset of the plurality of memory pages having the data temperature that satisfies the threshold condition comprises:

receiving, from a host system, an access request directed to a first memory page of the plurality of memory pages;

applying a plurality of hash functions to an identifier of the first memory page to generate a plurality of hash results; and executing respective queries of the plurality of Bloom filters to determine whether respective one or more values in the respective Bloom filters are in a set state, wherein the one or more values have respective index values that match the plurality of hash results.

14. The method of claim 13, wherein identifying the subset of the plurality of memory pages having the data temperature that satisfies the threshold condition further comprises:

responsive to the respective one or more values in the respective Bloom filters being in the set state, determining respective affirmative match results for the respective Bloom filters;

applying respective weighting values to the respective affirmative match results to determine the weighted results of the respective queries;

logically combining the weighted results of the respected queries to determine a combined result; and comparing the combined result to a threshold value.

15. The method of claim 14, wherein the combined result meeting or exceeding the threshold value indicates that the first memory page is part of the subset of the plurality of memory pages having the data temperature that satisfies the threshold condition, the method further comprising:

responsive to determining that the subset of the plurality of memory pages have the data temperature that satisfies the threshold condition, filter the subset of the plurality of memory pages using a second plurality of Bloom filters.

16. A non-transitory computer-readable storage medium comprising instructions that, when executed by a processing device, cause the processing device to:

track, using a plurality of Bloom filters, respective access requests directed to a plurality of memory pages stored in a memory system comprising a near memory component and a far memory component;

identify, based on a combination of weighted results of concurrent respective queries of the plurality of Bloom filters, a subset of the plurality of memory pages having a data temperature that satisfies a threshold condition; and cause the subset of the plurality of memory pages to be stored in the near memory component.

17. The non-transitory computer-readable storage medium of claim 16, wherein to track the respective access requests directed to the plurality of memory pages, the instructions cause the processing device to:

receive, from a host system, an access request directed to a first memory page of the plurality of memory pages;

apply a plurality of hash functions to an identifier of the first memory page to generate a plurality of hash results; and update one or more values in a first Bloom filter of the plurality of Bloom filters from a default state to a set state, wherein the one or more values have respective index values that match the plurality of hash results.

18. The non-transitory computer-readable storage medium of claim 17, wherein to track the respective access requests directed to the plurality of memory pages, the instructions cause the processing device to:

update one or more values in a second plurality of Bloom filters from the default state to the set state, wherein the one or more values have respective index values that match the plurality of hash results representing the subset of the plurality of memory pages identified using the plurality of Bloom filters.

19. The non-transitory computer-readable storage medium of claim 16, wherein to identify the subset of the plurality of memory pages having the data temperature that satisfies the threshold condition, the instructions cause the processing device to:

receive, from a host system, an access request directed to a first memory page of the plurality of memory pages;

apply a plurality of hash functions to an identifier of the first memory page to generate a plurality of hash results; and execute respective queries of the plurality of Bloom filters to determine whether respective one or more values in the respective Bloom filters are in a set state, wherein the one or more values have respective index values that match the plurality of hash results.

20. The non-transitory computer-readable storage medium of claim 19, wherein to identify the subset of the plurality of memory pages having the data temperature that satisfies the threshold condition, the processing device is further to:

responsive to the respective one or more values in the respective Bloom filters being in the set state, determine respective affirmative match results for the respective Bloom filters;

apply respective weighting values to the respective affirmative match results to determine the weighted results of the respective queries;

logically combine the weighted results of the respected queries to determine a combined result; and compare the combined result to a threshold value, wherein the combined result meeting or exceeding the threshold value indicates that the first memory page is part of the subset of the plurality of memory pages having the data temperature that satisfies the threshold condition.

* * * * *